United States Patent
Golobrodsky et al.

(10) Patent No.: US 9,210,142 B2
(45) Date of Patent: *Dec. 8, 2015

(54) METHOD FOR PROVIDING INTERNET SERVICES TO A TELEPHONE USER

(75) Inventors: Oleg Golobrodsky, Petah Tikva (IL);
Gideon Drori, Sha'arei Tikva (IL);
Yitzhak Peterburg, Tal Shahar (IL);
Moshe Peterburg, Ramat Hasharon (IL)

(73) Assignee: T-JAT SYSTEMS 2006 LTD., Tel-Aviv (IL)

( * ) Notice: Subject to any disclaimer, the term of this patent is extended or adjusted under 35 U.S.C. 154(b) by 1022 days.

This patent is subject to a terminal disclaimer.

(21) Appl. No.: 13/298,931

(22) Filed: Nov. 17, 2011

(65) Prior Publication Data
US 2012/0093147 A1    Apr. 19, 2012

Related U.S. Application Data

(63) Continuation of application No. 11/476,214, filed on Jun. 28, 2006, now Pat. No. 8,064,434.

(51) Int. Cl.
*H04L 12/66* (2006.01)
*H04L 29/06* (2006.01)
*H04L 29/08* (2006.01)

(52) U.S. Cl.
CPC .......... *H04L 63/08* (2013.01); *H04L 29/08846* (2013.01); *H04L 67/02* (2013.01); *H04L 67/28* (2013.01); *H04L 67/2819* (2013.01); *H04L 67/2823* (2013.01); *H04L 67/2838* (2013.01); *Y10S 379/90* (2013.01)

(58) Field of Classification Search
USPC .......... 379/88.12, 88.13, 88.23, 900; 455/412.2, 414.1; 370/352, 353
See application file for complete search history.

(56) References Cited

U.S. PATENT DOCUMENTS

| 5,889,845 A | 3/1999 | Staples et al. |
| 6,401,131 B1 | 6/2002 | Haverstock et al. |
| 6,732,332 B1 | 5/2004 | Borysewicz et al. |
| 6,745,230 B1 | 6/2004 | Cao et al. |

(Continued)

FOREIGN PATENT DOCUMENTS

| DE | 102 37 093 | | 2/2003 | |
| EP | 1 274 222 | * | 4/2002 | ............ H04M 7/00 |

(Continued)

*Primary Examiner* — Yosef K Laekemariam
(74) *Attorney, Agent, or Firm* — Novick, Kim & Lee, PLLC; Harold L. Novick (57) ABSTRACT

Method and system are disclosed for providing a telephone user with a capability to use Internet-based applications. The method comprises the following steps: At a first server, receiving an indication transmitted from the telephone denoting a request to be connected to an Internet-based application residing at a second server. Establishing a communication path that extends between the telephone and the second server via said first server. At the first server, creating a virtual client entity specific to that telephone and the Internet-based application to be used. The virtual client allows communication between the telephone device and that Internet-based application. The virtual client entity is maintained for the duration of a communication session that is about to take place between the telephone user and the Internet-based application. Thereby providing the telephone user the capability to use the Internet-based application, and enable exchanging communications between the second server and the telephone.

14 Claims, 4 Drawing Sheets

(56) References Cited

U.S. PATENT DOCUMENTS

| | | |
|---|---|---|
| 6,757,365 B1 | 6/2004 | Bogard |
| 6,865,608 B2 | 3/2005 | Hunter |
| 7,174,006 B2 * | 2/2007 | Guedalia et al. ........... 379/88.13 |
| 7,254,220 B1 | 8/2007 | Reding et al. |
| 2002/0083127 A1 | 6/2002 | Agrawal |
| 2003/0002633 A1 | 1/2003 | Kredo et al. |
| 2003/0069934 A1 | 4/2003 | Garcia-Martin et al. |
| 2004/0128310 A1 | 7/2004 | Zmudzinski et al. |
| 2006/0014530 A1 | 1/2006 | Denenberg et al. |
| 2006/0014531 A1 | 1/2006 | Nam et al. |
| 2006/0168037 A1 * | 7/2006 | Audu et al. ................... 709/206 |
| 2008/0086564 A1 | 4/2008 | Putman et al. |

FOREIGN PATENT DOCUMENTS

| | | |
|---|---|---|
| EP | 1 274 222 | 1/2003 |
| WO | WO 02/43351 | 5/2002 |

\* cited by examiner

METHOD FOR PROVIDING INTERNET SERVICES TO A TELEPHONE USER

CROSS-REFERENCE TO RELATED APPLICATIONS

This is a Continuation application of U.S. application Ser. No. 11/476,214, filed on Jun. 28, 2006, entitled "Method for Providing Internet Services to a Telephone User," the disclosure of which is expressly incorporated by reference herein in its entirety.

FIELD OF THE INVENTION

The present invention relates to telecommunication systems and, in particular, to systems adapted to the provisioning of Internet applications via telephone devices.

BACKGROUND OF THE INVENTION

Several techniques have been developed for connecting to or accessing Internet-based information resources on the World Wide Web (WWW) using conventional graphical user interface (GUI) based Internet browser programs. The availability of any particular Web-site surfing technique depends on where the Internet user finds himself or herself in the Internet browser program at any particular instant of time.

For example, if one is currently at a Web-site (i.e., in a particular HyperText Markup Language (HTML) document), at which there is a highlighted or embedded "link" specifying an Internet address of another Web-site (i.e., another HTML document), then the user can access (i.e., "surf to") this other Web-site by simply clicking on" or selecting the highlighted URL with his/her "mouse" in a conventional manner.

A typical process to access that information begins once the user has clicked on the link, the URL of the information resource or manually print into the browser program. More recently, with the growth and ever increasing complexity of the WWW, new services have been widely in use, services such as MSN, I Seek You ("ICQ"), and the like which require intensive interacting with the users of these services. Typically, in order to provide these services, the provider of the service uses one or more servers, with which the users are being in communication in order to receive the requested service. However, in order to allow this communication, the device used by the user is an end device, such as a personal computer (PC), a laptop, etc. which has an IP address that is used for the exchange of message between the user and the target, via the server(s) of the service provider. After the user has defined the service he/she would like to receive, e.g. by entering the WWW address of that service provider, then the browser program automatically connects the user's client system (i.e., Internet access terminal) to the Internet Server computer supporting the selected Web-site (service provider address).

The following references are brought as examples of the vast prior art that exist in connection with tile provisioning of services such as those described-above, to computer users.

U.S. Pat. No. 6,401,131 describes a system for enabling access to non-HTML files from a web browser. The user requests a non-HTML file from a database using a web browser, and the web browser transmits the request to a server via a HTTP server and module. The server locates and retrieves the document requested while the module translates the document to a format supported by the web browser. The HTTP server communicates the translated file to the web browser over a network. The web browser then presents the translated file to the user.

U.S. Pat. No. 6,732,332 discloses a system of creating Internet web content. Non-web content is received in a web content creation module, which automatically creates web content from the non-web content. An organizational database is then updated with information comprising web content structure information associated with the created web content, incorporating the web content into the web page.

Together with the development of applications and services for computer users, the functionalities of cellular phones have been rapidly developed and quite a few advanced applications and services are now offered to the cellular telephone users. However, the current cellular telephones, whether they are of the second generation or even of the third generation, have not been adapted to support such services, and although quite a few of their users may be interested in receiving services such as ICQ, MSN and other real time applications, still, the users of the currently available cellular devices cannot use these applications. The major reason is that the provider's server(s) that support such an application is adapted to communicate with a computer terminal by exchanging messages therewith. For a number of reasons, for example, as the cellular telephone keyboard has a limited number of keys its user has fewer capabilities to easily engage in real time communications with the application's server(s), this cannot be achieved through the use of cellular devices. One solution to overcome this problem is of course by introducing a full range of new cellular telephone devices. However, in view of the already existing number of devices and are being used and the extra size/weight that might be associated with the insertion of functionalities of a PC/laptop to a cellular telephone, another solution is required.

Another problem associated with the existing solutions is that the telephone user cannot receive indications of messages that await him/her at the server of the application's service provider. For example, if a message is sent to a telephone user who is a subscriber of the MSN service, he/she will not be able to receive any indication at his/her telephone device to promote his/her probing the MSN service to receive that message.

SUMMARY OF THE INVENTION

It is an object of the present invention to expand the range of applications that a telephone user may use.

It is another object of the present invention to provide methods and devices by which telephone users may communicate with others in real-time applications.

It is yet another object of the invention to provide methods and devices adapted to indicate a telephone user the fact that he/she has some messages awaiting for him/her at the server of the application's service provider.

Other objects of the invention will become apparent as the description of the invention proceeds.

According to an embodiment of the present invention, there is provided a method for providing a user of a telephone device with a capability to use Internet-based applications, which method comprises the steps of:

transmitting from the telephone device an indication towards a first server, denoting a user's request to be connected to an application residing at a second server;

establishing a communication path that extends between the telephone device and the second server via the first server;

at the first server, creating a virtual client entity adapted to communicate with the telephone device and with the application residing at the second server, for the duration of a communication session that is about to take place between the user and the application; and exchanging communications between the second server and the telephone device.

As will be appreciated by those skilled in the art, the provider that is in charge of providing services through the first server, does not necessarily have to be the same provider of the second server. In fact, since the first server is preferably designed to allow the user to choose an application from among a number of Internet-based applications, which are typically not maintained by a single service provider, at least for some, if not all, of the providers maintaining these second servers, will be different than the service provider that maintains the first server.

According to another embodiment of the invention, the method further comprises a step of authenticating the user by a service provider associated with the first server.

By yet another embodiment of the invention, the method further comprising a step of providing the user with a menu from which he/she may select a requested application, prior to carrying out the step of establishing the communication path, and preferably after being authenticated by the service provider associated with that first server.

In accordance with still another embodiment of the invention, the method further comprises a step of providing the user's telephone device with a plurality of WML/JSP/HTML (or in any other applicable format) pages transmitted from the first server.

By yet another embodiment, the method further comprises a step of establishing an Internet connection between the telephone device and the first server, prior to transmitting the indication, so that the operator in case for example of a cellular service may provide the Internet services as if it were an ISP (Internet Service Provider).

According to another embodiment, when the communication session takes place, the telephone device is provided with an emulation to allow the user to properly communicate with the selected application, e.g. to communicate as if the user of the telephone device uses a computer terminal (e.g. laptop, PC, etc.).

By yet another embodiment of the invention, the method provided is adapted to allow providing a user of a telephone device with an indication that a message was sent to him/her via an Internet-based application, irrespective of whether that user currently actively connected to that application or not. The method comprises the steps of:

at a second server associated with the Internet-based application, receiving a message addressed to the user;

forwarding the message towards a first server at which a virtual client entity was previously created to enable establishing a communication session that was previously held between the user of the telephone device and the Internet-based application;

determining whether the user is currently actively connected to the Internet-based application;

storing the message if the user is not currently actively connected to that Internet-based application; and providing the user with an indication that at least one message addressed to him/her has been stored.

Preferably, the telephone device is a mobile telephone device.

According to another embodiment of this aspect of the invention, the method further comprising carrying out the following steps when a user who had never been registered to that Internet-based application before, wishes to register:

transmitting a message towards the first server by the telephone device, denoting the user's request to be connected to that Internet-based application;

establishing a communication path extending between the telephone device and said second server via said first server;

at the first server, creating a virtual client entity adapted to communicate with the telephone device and with the Internet-based application;

associating a user ID and a password with that user in order to allow him/her to use the Internet-based application in the future; and storing an identification of the user at a database associated with that first server (e.g. the user's ID for that Internet-based application).

In accordance with yet another embodiment of the invention, the method provided further comprising a step of establishing an Internet connection between the telephone device and the first server prior to transmitting message-related indication to the user. Alternatively, the step of providing the user with that indication is carried out following the receipt of a request generated by the user of the telephone device to connect to any Internet-based application via that first server (the above Internet-based application, or another one). By another alternative, the step of providing the user with said indication is carried out following the establishment of a communication session between the telephone device and the Internet-based application. In accordance with yet another alternative of this embodiment of the invention, the step of providing the user with the indication is carried out by sending the indication to the telephone device following the storage of the message at the first server, irrespective whether a request to connect the user with said Internet-based application has been initiated.

By yet another embodiment, the method further comprises a step of establishing an Internet connection between the telephone device and the first server, prior to transmitting the indication, so that the operator associated with the user's telephone device may provide the user with Internet services as if it were an ISP (Internet Service Provider).

According to another aspect of the invention, there is provided a computer program product encoding a computer program for executing on a computer system a process for creating a virtual client entity adapted to communicate with a telephone device (preferably a mobile telephone device) and with an Internet-based application associated with a remote server, storing an identification of a user of the telephone device for communicating with the Internet-based application, storing messages forwarded towards a server associated with the computer program product from the remote server, and sending an indication towards the telephone device, indicating that there is/are stored messages addressed to the user of the telephone device.

Preferably, the messages addressed to the user are forwarded towards the server associated with that computer program product following a positive response made by that server to an interrogation initiated by the Internet-based application, in order to determine whether the user's identification is stored at the server associated with that computer program product, or in other words, to establish at which server has the user been registered with that Internet-based application.

According to another embodiment, the computer program product is further adapted to carry out an authentication procedure of the user.

By yet another embodiment, the virtual client entity is constructed to match at least one protocol used by the Internet-based application and at least one protocol by which the telephone device is adapted to communicate. Preferably, the at least one protocol used by the Internet-based application is different from the at least one protocol by which the telephone device is adapted to communicate.

According to yet another embodiment of the invention, there is provided a computer program product encoding a computer program for executing on a computer system a process for receiving one or more messages transmitted to a user of a telephone device via an Internet-based application associated with a remote server while said telephone user is not actively connected to the Internet-based application, enabling storage of messages received and providing the user with an indication that the messages have been stored.

DETAILED DESCRIPTION OF THE PREFERRED EMBODIMENT OF THE PRESENT INVENTION

A better understanding of the present invention is obtained when the following non-limiting detailed description is considered in conjunction with the following drawings.

Figure 1:
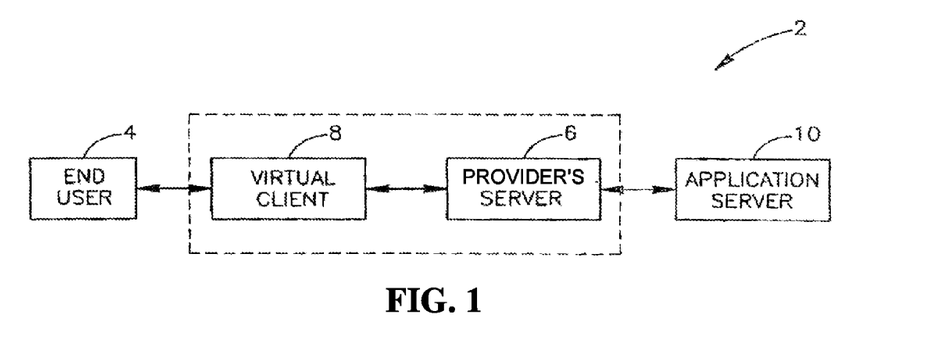
FIGS. 1 to 3 present block diagrams of systems construed in accordance with different embodiments of the present invention.

Let us consider now FIG. 1 which is a schematic block diagram of a system 2 according to an embodiment of the present invention. The system shown comprises end user 4 who wishes to conduct through his/her telephone device a session while using a certain application such as ICQ, AIM, MSN etc. The end user communicates with the provider's server (e.g. Tjat™ server) which is shown in this Fig. for illustration purposes only as being comprised of two entities, server 6 and virtual client 8. In reality such a server comprises some or all of the following functions: web application, web server, database. Java engine and Tjat application, which is operative to provide the connectivity between the user and the provider of the requested application.

At its other end, the provider's server is connected to the appropriate application server, 10. It should be noted that one of the advantages of the solution provided by the present invention is, that there is no need for the telephone device to be configured in any way to communicate with the virtual client entity, because the provider's server which receives the is able to recognize the resources available for the telephone device making the request on the one hand, and the requirements set for communicating with the requested application's server, so that the virtual client which is constructed by the provider's server is constructed in a way that takes into account these various constrains.

Figure 2:
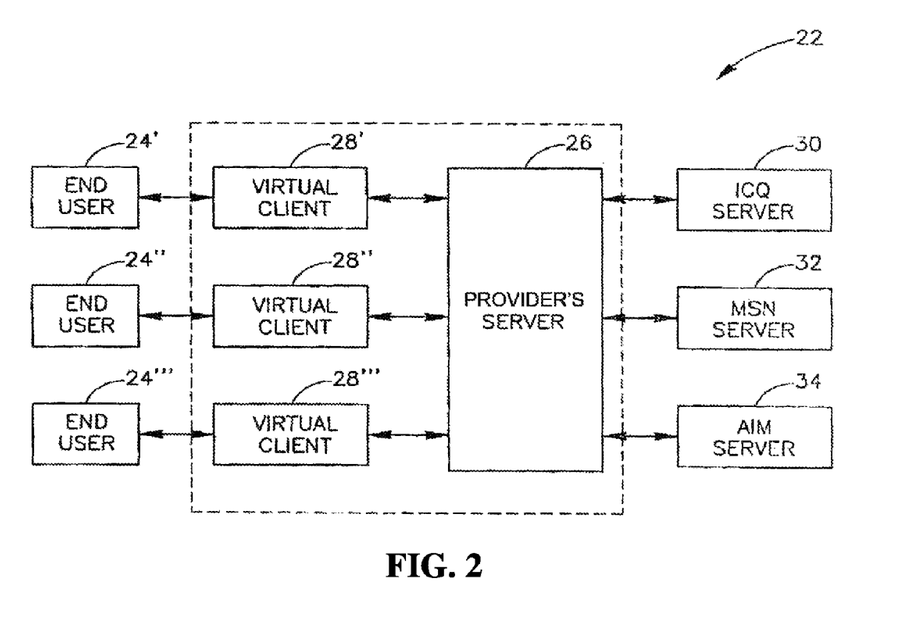

FIG. 2 shows another example of a system 22 in accordance with an embodiment of the present invention. By this example each of the three end users 24', 24" and 24'" communicate with the provider's server 26, requesting to use a different application. User 24' wishes to use the ICQ application, user 24" the MSN application and user 24'"—the AIM application. In server 26, three corresponding virtual clients are constructed, 28', 28" and 28'", respectively. Each of these virtual clients' entities is constructed in a way that it can communicate with the requested application's server. For example, the language used to communicate with the application server by one of these virtual clients can be Java while the virtual client constructed to meet the request of communicating with a different application can use a different language such as Brew, C#, or any other language applicable to mobile telephone devices.

Figure 3:
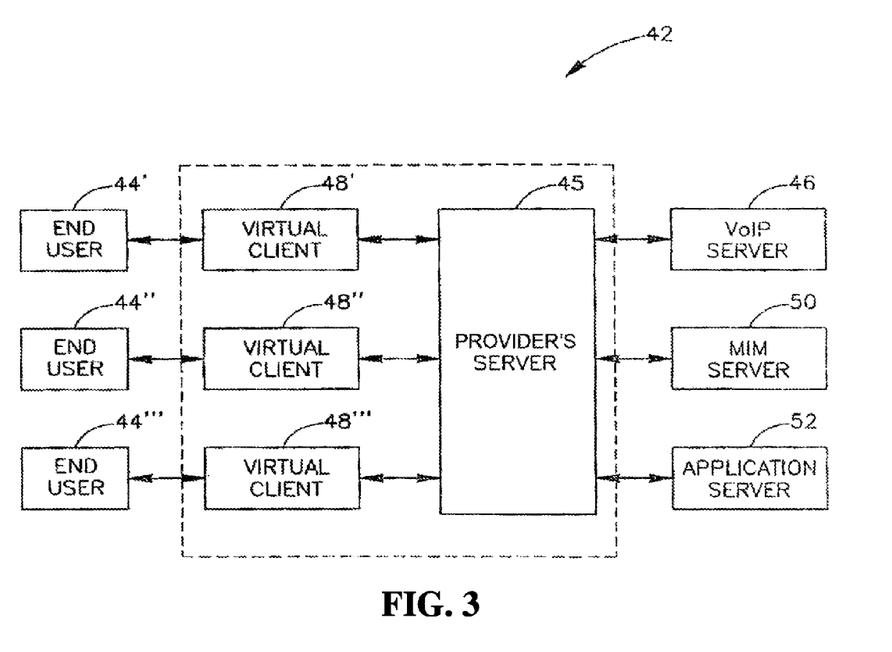

FIG. 3 presents yet another schematic illustration of an embodiment of system 42 construed according to the present invention. In this Fig., three telephone users, 44', 44" and 44'" are in communication with provider's server 45. However, by this example only one of the users, 44'", requests to communication with the application server 54, while the others is engaged with a voice over IP call (user 44') and user 44" to MIM (Mobile Instant Messaging). Server 45 with which all the users communicate, is capable of differentiating between the various requirement, so that after constructing the appropriate virtual client entities (48', 48" and 48'", respectively), directs the communications to the appropriate addresses. This way, the VoIP session held with the user 44' is routed via VoIP server 46, the session with user 44" via MIM server 50, while the session with user 44'" is directed to application server 52.

Figure 4:
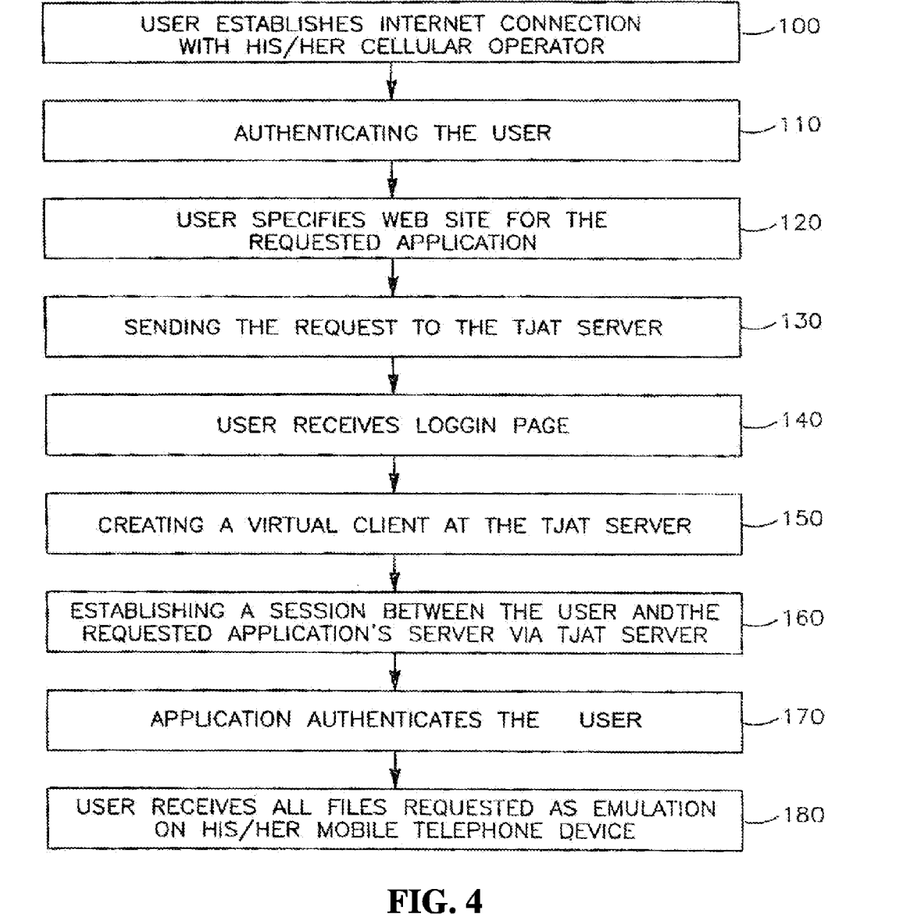
FIG. 4 demonstrates an example of carrying out the method according to another embodiment of the present invention.

FIG. 4 presents a flow chart of an example demonstrating the present invention. In this example, a cellular telephone user wishes to be connected to the ICQ application. The user opens the browser at his/her cellular device and establishes Internet connection such as GPRS/3G (or any other method supported by his/her current cellular operator) in order to conduct a communication session (step 100). Once the connection has been established, the cellular operator will authenticate the user (step 110) by applying any method known in the art per se for authenticating a mobile user in order to provide Internet connectivity and billing the user.

Next, the user specifies a web site (step 120), using his/her cellular telephone, e.g. the page wap.tjat.com. Once this page is loaded, the user receives a menu from which he/she should choose the application to use (e.g. ICQ). This request is then sent (step 130) to wap.tjat.com server, and the user receives in response a login page. At this stage, a virtual client (a "terminal service" like) is created (step 150) for the user by creating a phase java emulation thread between tjat server and the telephone user (the end user). This path will remain active until the user logs off. Preferably, the user receives all the WML/JSP/HTML (or in any other applicable format) pages from the tjat server, which will serve that end user as his/her "Application interface" (e.g. the "terminal service" based on that "Java emulation" thread) so that no software shall be required to be installed for the telephone device. Now, the tjat system has established the tunnel based on pre-defined icq- .com protocol where the tunnel extends between the server operative under the address icq.com to the server operative under the address tjat.com, and thereafter between the server tjat.com and the telephone user. Once the telephone user receives the login page, he/she may navigate with the aid of the telephone keys in order to select the requested application (i.e. the requested link). Upon selecting the requested link, the telephone device shall transmit a WML message with the selected application to the virtual client/which translates the information into a command in the language that is suitable to communicate with the tjat.com server (e.g. Java). Since the tjat.com server is the entity responsible to create the virtual client, there is no need to pre-defined a language for the operation of the virtual client. Following the above steps, the server opens a communication channel with the application server. In the case that the telephone's operating system is capable of translating the characters types by the user on his/her phone into symbols, the symbols will be communicated to the tjat.com server, otherwise, when the session is created, the characters will be transmitted to the tjat.com server, the telephone device will receive a WML page and the link can be selected therefrom.

On the login page, the user may now enter his/her user information associated with the application chosen, e.g. ICQ number and password.

Upon clicking on "connect", a new session is created (step 160) for that specific user between the tjat.com server and the icq.com server. The information provided by the user is then transferred to icq.com server in order for the ICQ provider to authenticate the user, by running an -AUTH query with icq.com validation servers (step 170). Once the user has been authenticated, he/she may login. Following the logging in of the user, he/she will receive all the WML/JSP/HTML (or in any other applicable format) files, depending on the end user requests, like "Contact list", "History", "User info" and/or any other page requested by the user. All these files will be received by the user as emulation, and not locally (application) on the mobile device (step 180).

During the period at which the user is in communication with wap.tjat.com he/she may be engaged in a variety of activities, such as sending/receiving messages, retrieving history files associated with other users included in his/her contact list, receiving information related to other users, adding/removing contacts, changing connection status, changing settings (e.g. encoding, certain interface features, not including the settings which are stored at the tjat.com associated database, and the like.

Figure 5:
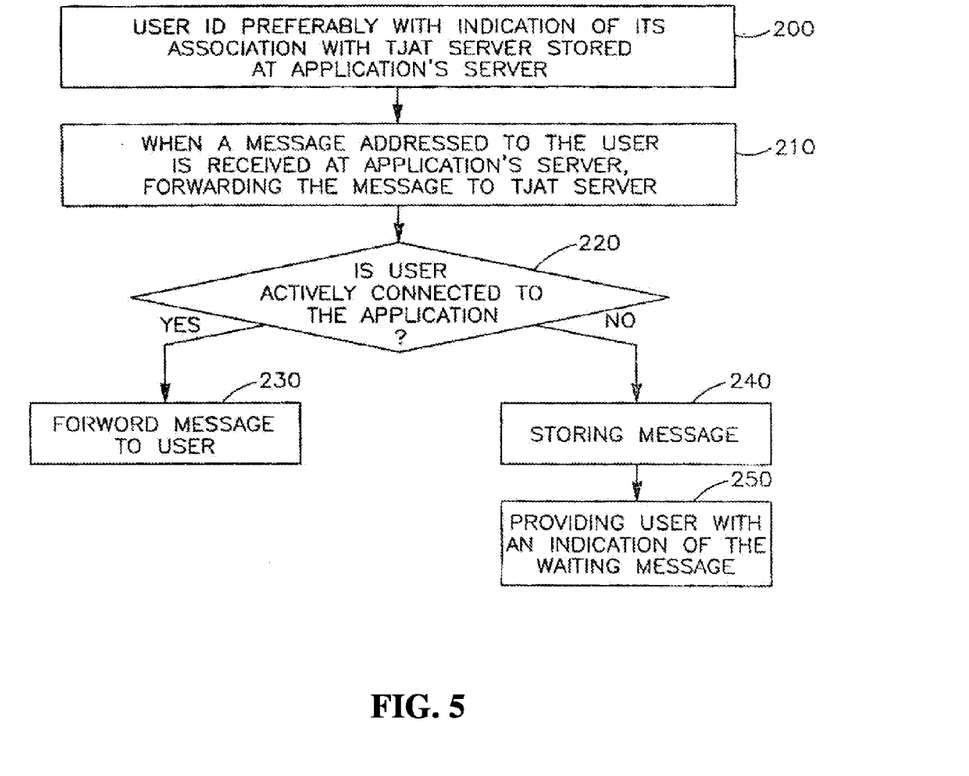
FIG. 5—demonstrates another example of an aspect of the present invention by which the user is notified of messages that have been received at times when he/she was not connected to the respective Internet-based application.

FIG. 5 presents a flow chart of another example demonstrating the present invention. In this example, a cellular telephone user wishes to be connected to the MSN application and receive messages including at times when he/she is off-line (i.e. not actively connected to the MSN application). According to this example the user has to be registered with the MSN application via the tjat server, and the establishment of that first communication session may be carried as described for example in FIG. 4.

When the user subscribes to the internet-based application, e.g. the MSN service, his/her user ID for that application is stored at the application's server (step 200). When a message received at the application server and destined to the user, it shall be forwarded (step 210) towards the tjat server. At the tjat server it is determined whether the user is currently connected to that Internet-based application (step 220). If it is determined that the user is indeed currently connected to the application server, the message will be forwarded to the user (step 230), otherwise, the message is stored at the tjat server (240) Next, the user is provided with an indication (step 250) that one or more messages are awaiting him/her. The indication preferably also includes an identification of the application through which that the message has been received.

There are a number of ways to carry out this step 250, all of which should be understood to be encompassed by the present invention. It may be carried out following the receipt of the user's request to be connected to that Internet-based application at any time after the message has been stored at the tjat server. Alternatively, the indication is provided to the user following the establishment of a communication session between the user and the Internet-based application at any time after the message has been stored at the first server. By yet another alternative, the indication is sent to the user's telephone device once storage of the message at the tjat server has been successfully completed, irrespective if the user has initiated a request to be connected to that Internet-based application, or not, so that the user may receive the indication while being for example in a telephone mode (as opposed to being in communication with an Internet-based application).

As will be appreciated by those skilled in the art, the examples provided illustrate some ways of establishing a communication tunnel between the telephone user and the application server, via an intermediate server and a virtual client application operative at that server. However, similar methods may be used to open and maintain that tunnel, without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

What is claimed:

1. A method for providing a user of a telephone device with a capability to use Internet-based applications, which method comprises the steps of:

at a first server, receiving an indication transmitted from said telephone device denoting a request to be connected to an Internet-based application residing at a second server;

establishing a communication path that extends between said telephone device and said second server via said first server;

at said first server, creating a virtual client entity specific to said telephone device and said Internet-based application to be used, created specifically to allow communication between said telephone device and said Internet-based application residing at said second server, and maintained only for the duration of a communication session that is about to take place between said user and said Internet-based application, thereby providing the user of said telephone device with the capability to use said Internet-based application; and exchanging communications between said second server and said telephone device.

2. The method according to claim 1, further comprising a step of authenticating the user by a service provider associated with said first server.

3. The method according to claim 1, further comprising a step of providing said user with a menu from which the user selects a requested application prior to carrying out the step of establishing said communication path.

4. The method according to claim 1, further comprising a step of establishing an Internet connection between said telephone device and said first server, prior to transmitting said indication.

5. The method according to claim 1, further operative to provide said user of a telephone device with an indication that a message was sent to him/her via the Internet-based application, selected from among a plurality of Internet-based applications available for sending said message, irrespective of whether said user is currently actively connected to said Internet-based application, wherein the method further comprises the steps of:

(i) at a second server associated with said selected Internet-based application, receiving a message addressed to said user;

(ii) forwarding said message towards a first server at which a virtual client entity had been created to enable establishing a communication session previously held between said user of the telephone device and said Internet-based application, the virtual client entity having been created specifically to allow communication between said telephone device and said Internet-based application residing at said second server and concluded upon termination of the communication session;

(iii) determining whether said user is currently actively connected to the Internet-based application;

(iv) storing the message if said user is not currently actively connected to said Internet-based application; and (v) providing said user with an indication that at least one message addressed to him/her has been stored.

6. The method according to claim 5, wherein said step of providing the user with said indication is carried out by sending said indication to the telephone device following storage of the message at said first server, irrespective of whether a request to connect said user with said Internet-based application has already been initiated.

7. The method according to claim 1, and wherein the method is further for providing said user of the telephone device with an indication that a message was sent to said user via an Internet-based application, selected from among a plurality of Internet-based applications available for sending said message, irrespective of whether said user is currently actively connected to said Internet-based application, comprising the additional steps of:

(i) at said second server, receiving a message addressed to said user;

(ii) forwarding said message towards said virtual client entity at said first server;

(iii) determining whether said user is currently actively connected to said selected Internet-based application;

(iv) storing the message if said user is not currently actively connected to said Internet-based application; and (v) providing said user with an indication that at least one message addressed to said user has been stored.

8. The method according to claim 7, and further comprising storing the message at said first server; and wherein said step of providing the user with said indication is carried out by sending said indication to the telephone device following storage of the message at said first server, irrespective of whether a request to connect said user with said Internet-based application has already been initiated.

9. A system adapted to provide a user of a telephone device with a capability to use Internet-based applications, which systems comprises:

a first server, operative to receive an indication transmitted from said telephone device denoting a request to be connected to an Internet-based application residing at one or more other servers;

a second server hosting said Internet-based application, or hosting a menu comprising a plurality of Internet-based applications among which said Internet-based application is included;

one or more processors adapted to establish a communication path that extends between said telephone device and said one or more other servers via said first server; and wherein said first server comprises at least one processor operative to create a virtual client entity specific to said telephone device and said Internet-based application to be used, wherein said virtual client entity is created specifically to allow communication between said telephone device and said Internet-based application residing at said one or more other servers, and wherein said virtual client entity is maintained only for the duration of a communication session that is about to take place between said telephone device and said Internet-based application, thereby providing the user of said telephone device with the capability to use said Internet-based application.

10. The system according to claim 9, wherein said first server processor is further operative to provide said user with a menu from which the user is able to select a requested application prior to establishing said communication path.

11. The system according to claim 9, wherein said processor is adapted to establish an Internet connection between said telephone device and said first server, prior to transmitting said indication.

12. A non-transitory computer-readable storage media storing one or more sequences of instructions which when loaded and executed by a first server, causes one or more processors to perform a method for providing a user of a telephone device with a capability to use Internet-based applications, by carrying out the steps of:

receiving an indication transmitted from said telephone device denoting a request to be connected to an Internet-based application residing at a second server;

establishing a communication path that extends between said telephone device and said second server via said first server;

creating a virtual client entity specific to said telephone device and said Internet-based application to be used, created specifically to allow communication between said telephone device and said Internet-based application residing at said second server, and maintained only for the duration of a communication session that is about to take place between said user and said Internet-based application, thereby providing the user of said telephone device with the capability to use said Internet-based application; and enabling exchange of communications between said second server and said telephone device.

13. The non-transitory computer-readable storage media according to claim 12, wherein the method further comprises a step of providing said user with a menu from which the user selects a requested application prior to carrying out the step of establishing said communication path.

14. The non-transitory computer-readable storage media according to claim 12, wherein the method further comprises a step of establishing an Internet connection between said telephone device and said first server, prior to transmitting said indication.

* * * * *